US012560797B2

(12) United States Patent
Parry

(10) Patent No.: US 12,560,797 B2
(45) Date of Patent: Feb. 24, 2026

(54) TELESCOPES

(71) Applicant: Cambridge Enterprise Limited, Cambridge (GB)

(72) Inventor: Ian Robert Parry, Cambridge (GB)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 547 days.

(21) Appl. No.: 17/629,732

(22) PCT Filed: Jul. 17, 2020

(86) PCT No.: PCT/EP2020/070297
§ 371 (c)(1),
(2) Date: Jan. 24, 2022

(87) PCT Pub. No.: WO2021/018634
PCT Pub. Date: Feb. 4, 2021

(65) Prior Publication Data
US 2022/0244519 A1 Aug. 4, 2022

(30) Foreign Application Priority Data

Jul. 26, 2019 (GB) ...................................... 1910732

(51) Int. Cl.
*G02B 23/06* (2006.01)
*G02B 26/06* (2006.01)
(52) U.S. Cl.
CPC ............. *G02B 23/06* (2013.01); *G02B 26/06* (2013.01)
(58) Field of Classification Search
CPC ...... G02B 26/04; G02B 26/02; G02B 26/007; G02B 26/08; G02B 26/06; G02B 23/12; G02B 23/06; G02B 23/04; G02B 23/02; G02B 23/00
See application file for complete search history.

(56) References Cited

U.S. PATENT DOCUMENTS

| | | | | |
|---|---|---|---|---|
| 4,326,800 A | | 4/1982 | Fitts | |
| 5,128,530 A | * | 7/1992 | Ellerbroek | ............. G02B 26/06 356/121 |
| 5,159,489 A | * | 10/1992 | Massie | ................... G02B 7/183 359/429 |

(Continued)

OTHER PUBLICATIONS

Combined Search and Examination Report issued in connection with corresponding GB Application No. 1910732.5 dated Jan. 13, 2020.
International Search Report and Written Opinion for corresponding PCT Patent Application No. PCT/EP2020/070297 dated Oct. 12, 2020.

(Continued)

*Primary Examiner* — Sharrief I Broome
*Assistant Examiner* — Journey F Sumlar
(74) *Attorney, Agent, or Firm* — Tarolli, Sundheim, Covell & Tummino LLP

(57) ABSTRACT

A telescope including an optical alignment system. The telescope has a light collecting aperture, an imaging region for an imaging sensor, and comprises a plurality of optical elements between the light collecting aperture and the imaging region. The optical alignment system comprises a diffraction pattern on a surface of one of the optical elements, a light source to illuminate the diffraction pattern, and a metrology system to receive diffracted light from the light source after diffraction by the diffraction pattern. The metrology system is configured to characterize a wavefront of the diffracted light for determining an optical alignment of the telescope.

10 Claims, 8 Drawing Sheets

(56) References Cited

U.S. PATENT DOCUMENTS

| | | | |
|---|---|---|---|
| 5,198,653 A | 3/1993 | Shen | |
| 5,274,479 A | 12/1993 | Zmek | |
| 5,282,016 A | 1/1994 | Shen | |
| 6,025,908 A | 2/2000 | House-Walter | |
| 6,649,895 B1 | 11/2003 | Wirth | |
| 2014/0168650 A1* | 6/2014 | Manassen | G02B 27/146 |
| | | | 362/558 |
| 2015/0104188 A1* | 4/2015 | Norman | G02B 23/02 |
| | | | 359/291 |

OTHER PUBLICATIONS

Howard, 2004, "Optical design study for NASA's spherical primary optical telescope (SPOT)", SPIE, Proc. SPIE 5524, Novel Optical Systems Design and Optimization VII, (Oct. 22, 2004), doi: 10.1117/12.559945.
David B. DeYoung, James D. Dillow, Stephen P. Corcoran, Edwina V. Andrews, Julius Yellowhair, Kevin DeVries, "Ground demonstration of an optical control system for a space-based sparse-aperture telescope," Proc. SPIE 3356, Space Telescopes and Instruments V, (Aug. 28, 1998), doi: 10.1117/12.324516.
Parry et al., 2016, "SUPERSHARP—Segmented Unfolding Primary for Exoplanet Research via Spectroscopic High Angular Resolution Photography", arXiv:1801.06111.
Stanley J. Kishner, "High-bandwidth alignment sensing in active opticalsystems," Proc. SPIE 1532, Analysis of Optical Structures, (Dec. 1, 1991); doi: 10.1117/12.48267.

* cited by examiner

TELESCOPES

RELATED APPLICATIONS

The present invention is a U.S. National Stage under 35 USC 371 patent application, claiming priority to Serial No. PCT/EP2020/070297, filed on Jul. 17, 2020; which claims priority from Great Britain Patent Application No. 1910732.5 filed on Jul. 26, 2019; the entirety of both are hereby incorporated herein by reference.

FIELD

This invention relates generally to alignment techniques for telescopes. One example application is for space telescopes which can self-align once unfolded and deployed.

BACKGROUND

The optics of a telescope have to be accurately aligned with respect to each other in order for the telescope to work properly. Alignment can include placing the individual optics, placing segments of a single optic (large telescopes often have segmented primary mirrors), and controlling the shape of a deformable mirror. For diffraction limited telescopes, some of the optical elements have to be positioned with respect to one another to within a fraction of a wavelength of light.

After the telescope is accurately aligned via some procedure the alignment will be maintained for a period. However the initial alignment can drift over time such that the quality of the images provided by the telescope are no longer as good as they were after the initial alignment. Alignment drift can be caused by many things including variations of temperature, variations of gravity vector, wind buffeting, and acoustic vibrations.

Most telescope structures employ passive techniques to deal with these variations. Some telescopes use a distant external light source, e.g. a star, to measure wavefront error i.e. alignment error.

Two real ground-based telescopes, the Hobby-Eberly Telescope and the South African Large Telescope, use a light source at the centre of curvature of the primary mirror of the telescope to align only the primary mirror, i.e. not the whole telescope optical system. This system is used during an initial set-up procedure prior to using the telescope to view the sky; it cannot be used whilst viewing.

Some proposed space telescopes have a light source and a metrology system at the centre of curvature of the primary mirror. These give alignment information about the primary mirror only, and the length of the telescope is doubled because hardware needs to be placed at the centre of curvature (whereas parallel light is focused at half this distance). These telescopes are described in: Howard, 2004, "Optical design study for NASA's spherical primary optical telescope (SPOT)", SPIE, Proc. SPIE 5524, Novel Optical Systems Design and Optimization VII, (22 Oct. 2004), doi: 10.1117/12.559945; David B. DeYoung, James D. Dillow, Stephen P. Corcoran, Edwina V. Andrews, Julius Yellowhair, Kevin DeVries, "Ground demonstration of an optical control system for a space-based sparse-aperture telescope," Proc. SPIE 3356, Space Telescopes and Instruments V, (28 Aug. 1998), doi: 10.1117/12.324516; and Parry et al, 2016, "SUPERSHARP—Segmented Unfolding Primary for Exoplanet Research via Spectroscopic High Angular Resolution Photography", arXiv:1801.06111. Other background prior art can be found in U.S. Pat. Nos. 6,649,895 and 6,025,908.

Some telescopes use an internal light source to measure wavefront error in an arrangement in which the light that propagates out of telescope and is scattered back into the telescope by the earth's atmosphere, e.g. a so called "laser guide star". The measured wavefront error is due to a combination of the telescope and the atmosphere.

A telescope can be aligned using a flat mirror placed ahead of the telescope so that light from an internal source will return back through the telescope. If the flat mirror is perfect, the measured wavefront errors will only be due to the telescope. However the telescope cannot be used to view distant objects while the flat test mirror is in place.

SUMMARY

In one aspect there is therefore described a telescope including an optical alignment system. The telescope has a light collecting aperture, an imaging region for an imaging sensor, and comprises a plurality of optical elements between the light collecting aperture and the imaging region. The light collecting aperture need not be a physical aperture e.g. it may be defined by a lens or a mirror. The imaging region may comprise a focal plane of the telescope; this may be curved e.g. if the telescope is a Schmidt camera. The telescope may include the imaging sensor, which may comprise a camera and/or spectrometer.

The optical alignment system may comprise a diffraction pattern on a surface of one of the optical elements. The optical alignment system may further comprise a light source to illuminate the diffraction pattern. The optical alignment system may further comprise a metrology system e.g. a wavefront sensor, to receive diffracted light from the light source after diffraction by the diffraction pattern. The metrology system may be configured to characterize a wavefront of the diffracted light, e.g. by measuring a wavefront error of the diffracted light, for determining an optical alignment of the telescope.

The optical alignment system may be configured to determine whether or not the (imaging) optics of the telescope are aligned and/or may measure a degree of alignment and/or may be used to automatically align the (imaging) optics of the telescope i.e. the plurality of optical elements.

As previously mentioned, such alignment may comprise determining relative alignments of the optical elements and/or, where one of the optical elements is an active optical element, controlling a shape of the active optical element e.g. the shape of a deformable mirror surface or other phase-correcting element. The deformable mirror surface may be the surface of a primary mirror and/or of one or more other mirrors in an imaging optical path of the telescope. The primary mirror may be a segmented mirror.

Thus the optical alignment system may include an active optics control system coupled to the metrology system to control the active optical element to correct the wavefront error e.g. e.g. so that the wavefront is substantially planar or spherical. Any suitable algorithm may be used. As described later, the optical alignment system may operate during normal use of the telescope, that is at the same time as the telescope is used for observing.

Implementations of this system have many advantages.

An internal light source can be used to measure wavefront error for the full telescope system, and if desired only for the full telescope system. However it is not essential for the system to be used to align the optical system of the full telescope and in some implementations the system may be used to align only part of the optical system.

In implementations an optical path between the light source and the metrology system does not extend beyond the light collecting aperture, beyond an outer optical surface of this aperture if e.g. it comprises a lens.

In implementations there is no need for a flat mirror in front of the telescope, and no need to put the internal light source and the metrology system at the centre of curvature of the telescope primary mirror (where present), which would otherwise approximately double the length of the telescope.

For a telescope designed to operate in space the alignment procedure during manufacture and testing (i.e. pre-launch) may be the same as when it is in orbit, which is an important advantage.

For a ground-based telescope the continuous alignment procedure can ensure that the image quality of the telescope is only limited by the wavefront errors introduced by the atmosphere between the telescope and the object being viewed.

Implementations of the system facilitate continuous and rapid correction of positioning errors of the optical elements, which allows the telescope structure to have a very light-weight structure. This also facilitates the use of an unfolding (deployable) structure which can self-align after deployment. It also allows the telescope structure to have a short thermal timescale (for heating/cooling).

In implementations the diffraction pattern introduces a path difference across the telescope aperture, which can increase the sensitivity of the metrology system to the measurement of phase errors.

In some implementations the surface of the optical element bearing the diffraction pattern is the first surface of the telescope i.e. the first optical surface on which collected light from a viewed object impinges (which may or may not bear a coating). The first surface may be, for example, the surface of a primary mirror of a reflecting telescope or the front surface of a lens, or the front surface of a combined lens and mirror. Thus the primary optical element of the telescope may be aligned.

In some implementations one or both of the light source and the metrology system is located after a last of the optical elements on an optical path from the light collecting aperture to the imaging region. Thus a complete (imaging) optical system of the telescope may be aligned.

In implementations the diffraction pattern is configured to diffract light from the light source to the metrology system. In some convenient implementations the light source and metrology system are both on an optical axis of the telescope. Thus the diffraction pattern may comprise a radial grating pattern i.e. a pattern of diffracting rings, e.g. concentric rings, e.g. centred on the optical axis of the telescope. The rings may but need not be circular. For example other patterns of diffracting rings may be used to direct light off-axis e.g. in some implementations the rings may be elliptical. In principle a diffraction pattern different to a radial grating pattern may be used (the pattern may then be designed using optical design software).

The diffraction pattern may be present on all or only a part of the surface of the optical element. For example in a segmented mirror telescope the diffraction pattern may not be present on all the mirror segments. For example in a segmented mirror telescope the diffraction pattern may be present on each of the mirror segments but not present over the entire surface of each segment.

The diffraction pattern may be formed in any convenient manner, e.g. by an additive process e.g. as a coating or by a subtractive process e.g. by etching or ablation of the surface.

The diffraction pattern may be faint, i.e. configured for low diffraction efficiency, e.g. to facilitate simultaneous observation and alignment. For example in implementations the diffraction pattern is configured to diffract less than 50%, 20%, 10% 5% or 3% of light from the light source impinging on the surface, e.g. less than 10% of the impinging light intensity into the first order. Nonetheless optionally the grating may be a blazed grating to favour a particular diffraction order, although in other implementations an optical profile of the grating may be e.g. rectangular or sinusoidal.

The diffraction pattern may be configured to be faint by configuring amplitude modulation of the diffraction pattern (e.g. reflectivity or transmissivity) and/or phase modulation of the diffraction pattern (e.g. shape). To implement amplitude modulation a literally faint coating may be employed, or the pattern may comprise very dark narrow lines with a very large spacing of unaffected optic in between. To implement phase modulation the diffraction pattern may be configured as a sinusoidal wave-like ripple. The waves may be centred on the optical axis and the distance between the waves may depend on their distance from the optical axis. This is convenient for some implementations because the amount of light that is diffracted depends directly on the amplitude of the sine wave and so can easily be controlled. Ion beam etching can be used to simultaneously apply the diffraction pattern and configure a shape of the underlying reflective (or refractive) surface, which is helpful for ensuring that they both share a common optical axis.

In some implementations the telescope may include an optical filter, e.g. a notch filter, on an optical path between the light collecting aperture and the imaging region to attenuate light from the light source. The light source may comprise a laser such as a laser diode. The light source may have a bandwidth (e.g. −3 dB optical power width) of less than 1% of a wavelength of the light source, e.g. <10 nm. These features help to decouple the observation and alignment optical systems.

In some implementations the light source and the metrology system define substantially coincident (e.g. co-located) conjugate optical positions. That is, the light source and the metrology system, e.g. wavefront sensor, may each define a respective image or focal plane (for light originating from the light source and light received by the metrology system respectively), and these image or focal planes may be optically conjugate to one another.

Where the first surface of the telescope is a mirror surface these coincident conjugate optical positions may be nearer to the mirror surface than a centre of curvature of the mirror surface e.g. at or adjacent a focal plane of the mirror surface. In such a system the diffracted light may be reflected from the mirror surface back along the path it arrived from but need not travel along a normal to the surface because of diffraction; instead it may travel at an acute angle to the normal.

In some other implementations the light source and the metrology system may define different conjugate optical positions, that is the light source and the metrology system may be in different locations.

In some implementations the metrology system may comprise a Shack-Hartmann or similar wavefront sensor. The metrology system may measure a wavefront error in two orthogonal dimensions e.g. tip and tilt. An active optical surface may then be controlled to make corresponding corrections.

In a related aspect there is provided a method of optically aligning a telescope. The telescope may comprise a light collecting aperture, an imaging region for an imaging sensor, and a plurality of optical elements between the light collecting aperture and the imaging region. The method may comprise using a surface of the optical elements to diffract light from a light source to a metrology system e.g. by providing the surface with a diffraction pattern. The method may further comprise using the metrology system to determine wavefront characterization data characterizing a wavefront of the diffracted light e.g. wavefront error data. The method may further comprise optically aligning the telescope using the wavefront characterization data.

In some implementations the plurality of optical elements includes an active optical element, the wavefront characterization data characterizes a wavefront error at the imaging region/plane, and optically aligning the telescope using the wavefront characterization data comprises adjusting the active optical element in response to the wavefront error. In implementations the wavefront error measured using the diffracted light corresponds to a wavefront error for light collected by the telescope and imaged at the imaging region/plane.

In some implementations the method is performed whilst observing using the telescope. Thus the alignment method may be performed at intervals or continuously during normal use of the telescope for observation (which here includes observation by camera or spectroscope).

DRAWINGS

These and other aspects of the invention will now be further described by way of example only, with reference to the accompanying Figures, in which.

DESCRIPTION

In broad terms there is described a method of measuring the alignment errors of the optics of a telescope using a diffractive surface and an internal light source i.e. a light source which is not located beyond a front aperture of the telescope. There is no need for a mirror to be located in front of the telescope to reflect light back from the light source back into the telescope.

A light source placed at a first location A is able to send light into the optics of the telescope. One of the optical surfaces of the telescope is configured to diffract light from the light source, in addition to the surface properties it has as part of the optical design of the telescope, so that some of the injected light returns by diffraction to a second location B where the light can be recorded and analysed. In implementations the analysis measures the wavefront errors generated by the optics of the telescope, and hence measures misalignment(s) of the optics of the telescope along the optical path from A to B.

In implementations one or more of the optical elements of the telescope may be provided with actuators to adjust the position and/or configuration of the optical element(s). Thus the measured alignment errors can be used to make adjustments to the positions of the optics so that the optical system is brought into optimal alignment.

A special case is when the diffractive surface is the first surface of the telescope and either or both of the locations A and B are after the last optical element of the telescope. In this case the light source is reimaged by the full optical system of the telescope and thus the full optical system can be aligned.

The optical surface of the telescope configured to diffract light defines a diffraction grating. The light source and the returned image, i.e. locations A and B, are conjugate optical positions. The positions of these conjugates can be designed to be anywhere inside the telescope by changing the design of the diffraction grating, which may comprise part of all of a pattern of concentric rings i.e. which may be a radial grating.

This alignment method can be used continuously while the telescope is being used to view distant objects.

Figure 1:
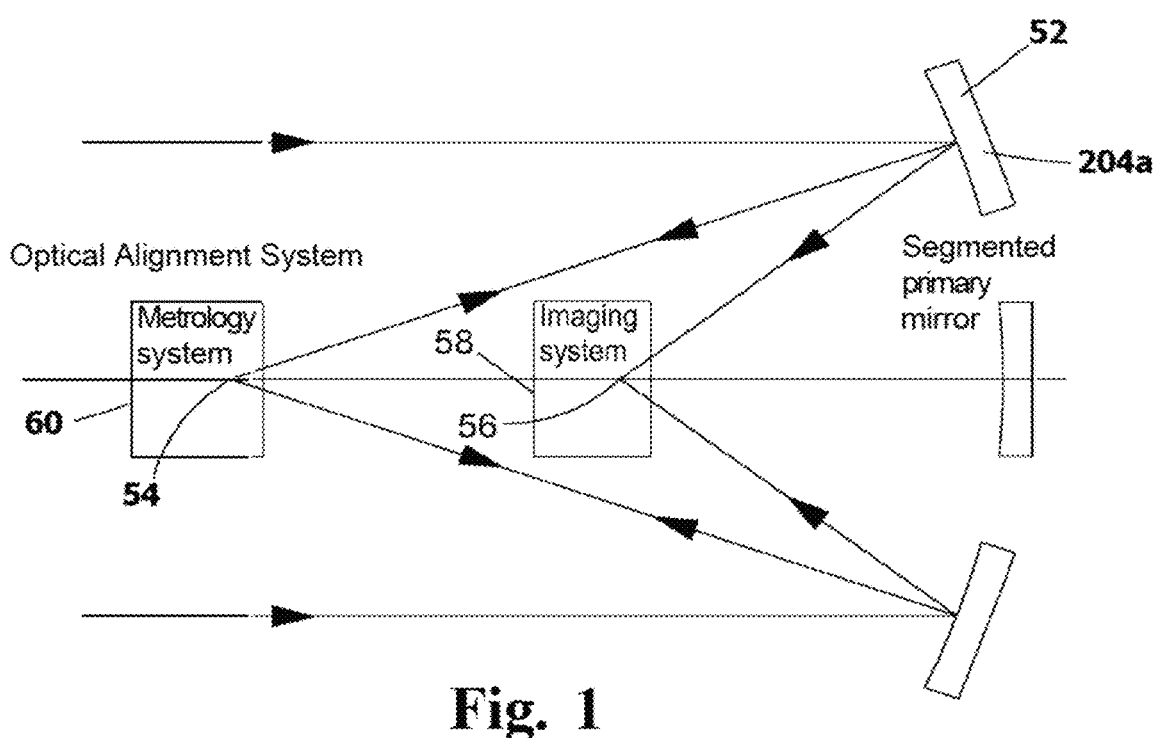
FIG. 1 shows a metrology system with an internal light source according to the prior art.

FIG. 1 shows a schematic illustration of a telescope 50 including an alignment system. A metrology system 60 is located at a centre of curvature 54 of a segmented primary mirror 52. The metrology system 60 is twice as far from the mirror as an imaging system 58 located at a focal point 58 of the primary mirror.

Figure 2:
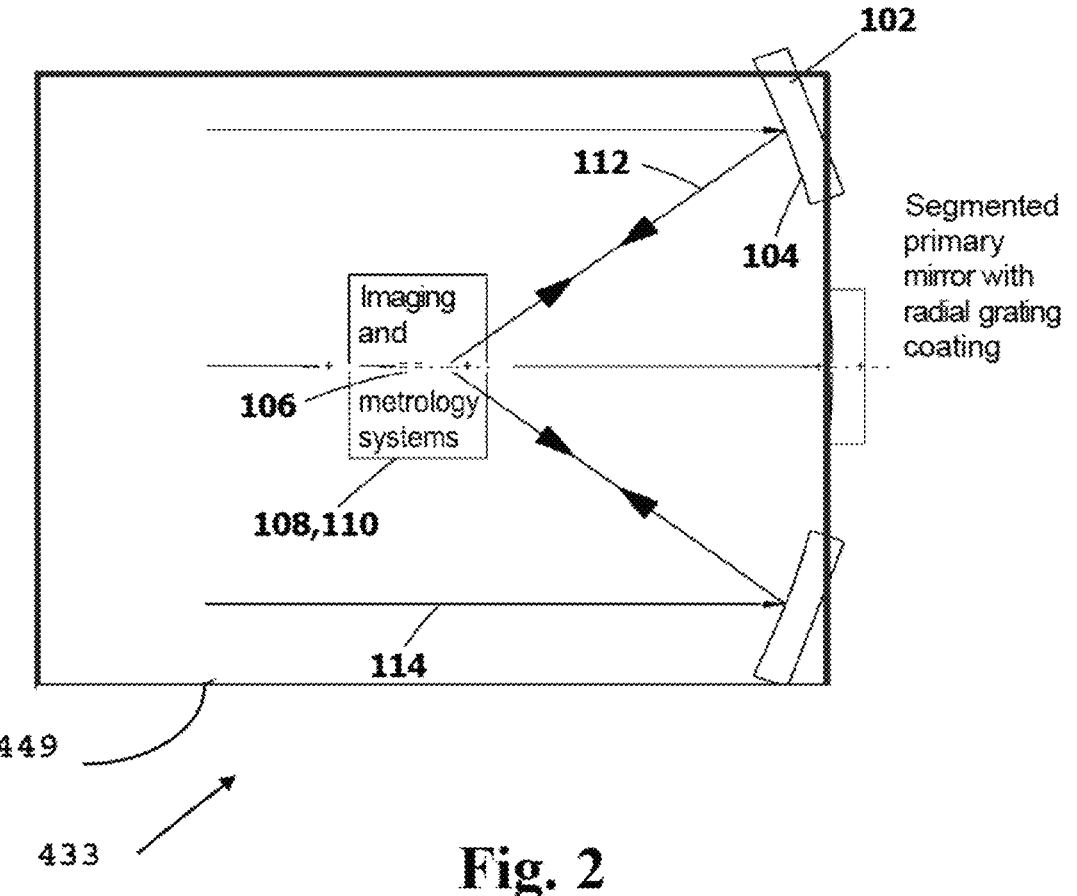
FIG. 2 shows an example of a metrology system using a diffractive pattern.

FIG. 2 shows a schematic illustration of a telescope 100 including an alignment system which uses the techniques described herein. In FIG. 2 segmented primary mirror 102 has a diffractive pattern 104 which provides a surface of the mirror with a radial grating. Rays 114 indicate light from a distant object viewed by the telescope.

In the example of FIG. 2 an imaging system 108 and a metrology system 110 are collocated at a focal point 106 of the telescope. Thus FIG. 2 shows an example metrology light path 112 in which the return image is coincident with a light source (not shown) for the telescope. Note that the rays on the mirror segment are not at right angles to the surface because they follow the law of diffraction (the grating equation) rather than the law of reflection. An optical alignment system 116 comprises a diffraction pattern on a surface of the one of the optical elements and a metrology system.

Figure 3:
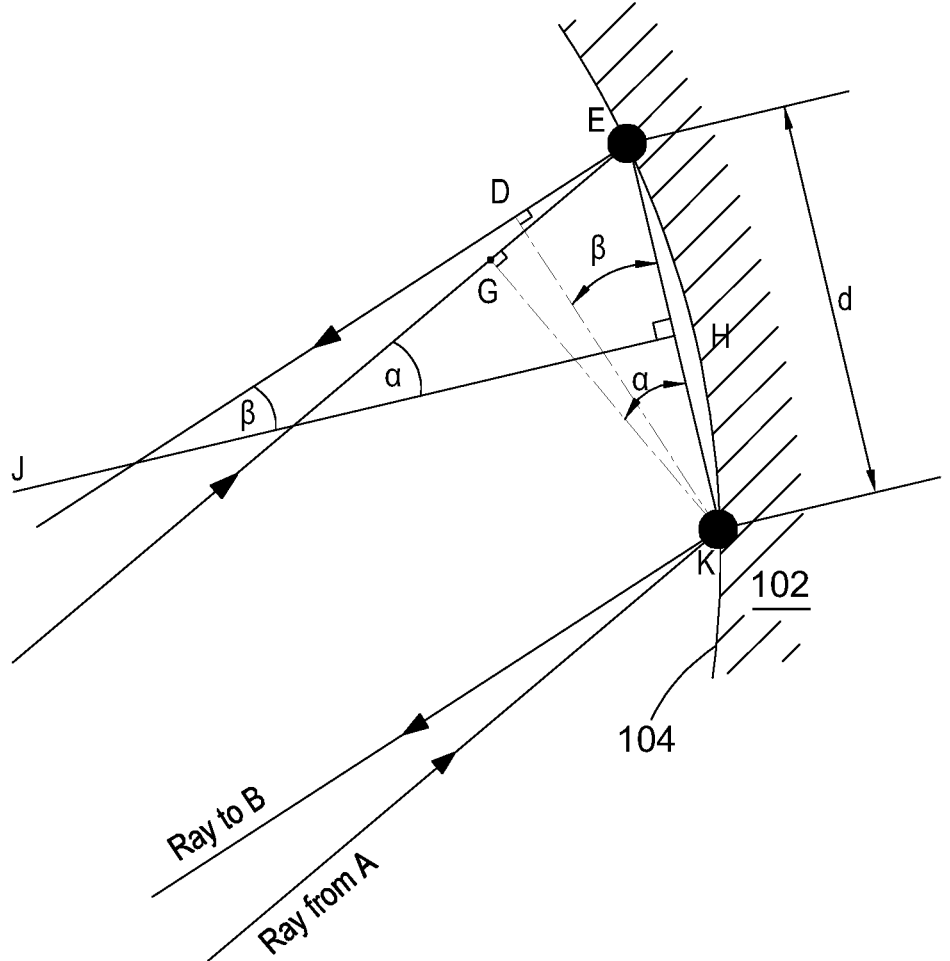
FIG. 3 shows details of a surface bearing the diffractive pattern.

FIG. 3 shows a ray diagram illustrating operation of the optical alignment system, in particular the diffraction pattern on a surface of one of the optical elements, in FIG. 3 the diffractive pattern 102 on the primary mirror 102.

In FIG. 3 features E and K represent, schematically, a cross-section through rings of a diffraction pattern centred on an optical axis of the system. The spacing between these rings is d. The number of integer wavelengths for constructive interference, i.e. the spectral order, is m. The wavelength of light from the light source is $\lambda$. The refractive index of the medium containing the rays is n. The line JH is normal to the diffractive surface.

The total path difference for the two rays shown is the distance DE+the distance GE. This will be an integer number of wavelengths. Therefore the equation relating the incident angle $\alpha$ and the diffracted angle $\beta$ (in the Figure) is:

$$m\lambda = nd(\sin \alpha + \sin \beta)$$

In this example the features on the diffractive surface form a radial grating centred on the optical axis. The distance between two consecutive rings varies with distance from the optical axis. For example, if n=1 and α=β=18 degrees, λ=500 nm and m=15 then d=12 microns.

Figure 4:
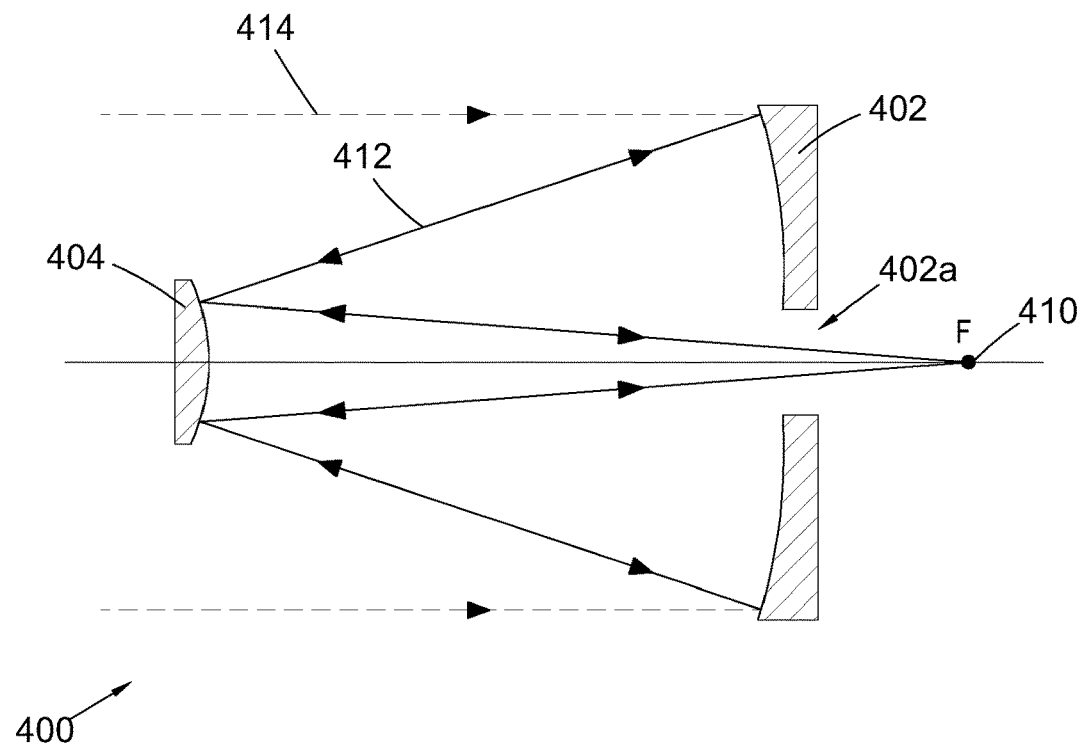
FIG. 4 shows a possible implementation for a Cassegrain telescope.

FIG. 4 shows a schematic illustration of a first example Cassegrain telescope 400 including an alignment system which uses the techniques described herein. The telescope 400 includes a primary mirror 402 with an aperture 402*a* and bearing a diffractive pattern as previously described, and a secondary mirror 404.

Dashed rays 414 indicate light from a distant object which comes to a focus at point F. Solid rays 412 are from a light source 410 at F, which are diffracted back from the primary mirror so that they come back to a focus also at F, at which a metrology system is co-located. This shows an example of a metrology light path which uses all the optical surfaces of the telescope.

Figure 5:
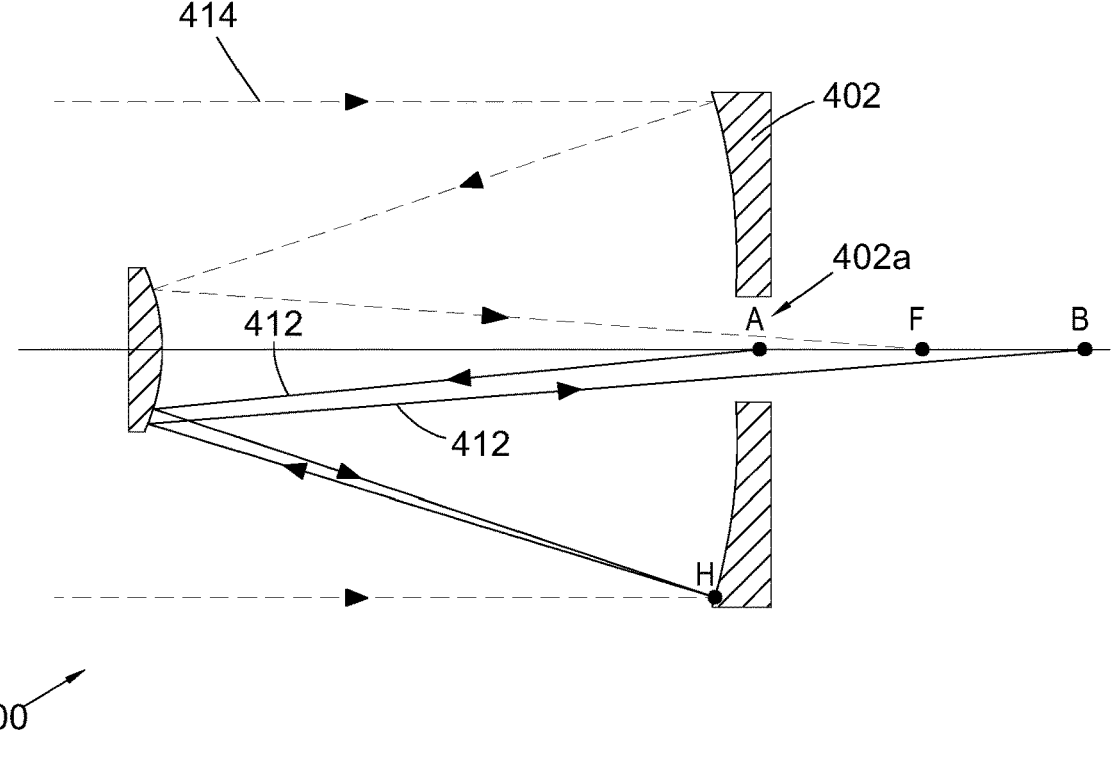
FIG. 5 shows another possible implementation for a Cassegrain telescope.

FIG. 5 shows a schematic illustration of a second example Cassegrain telescope 500 also including an alignment system which uses the techniques described herein. In FIG. 5 the light source, metrology system, and (observing) imaging sensor are in different locations, respectively A, B, and F. Thus the light source is located at A and the diffracted image, which can be used for metrology, is located at B. Like elements to FIG. 4 have like reference numerals.

In some implementations the diffractive pattern is faint i.e. has a low modulation depth, so that only a small fraction, e.g. <1% of the light from the internal source returns. This ensures that most of the light from an external object to be imaged by the telescope is be collected and thus the telescope can implement the alignment system with very little efficiency loss.

The diffraction pattern may be formed in many ways. For example the primary mirror of a telescope may have a coating, e.g. a protective/anti-reflection magnesium fluoride coating in which the diffraction grating may be formed. In some other cases the primary mirror may be e.g. glass with a reflective metal coating in which the diffraction grating may be formed. In some other cases the primary mirror may be formed of metal, and the diffraction grating may be formed in the metal. In some other cases the primary mirror may be provided with an additional surface treatment in which the diffraction grating may be formed.

The diffractive features may be formed, for example, using lithographic techniques (e.g. as used for computer generated holograms), or by laser ablation, or by ion beam etching or electron beam etching. The diffractive features may be formed on the primary mirror or lens of a telescope and/or on other optical surfaces of the telescope.

In some implementations the internal light source is bright to facilitate accurate measurement of the wavefront error.

In some implementations the light source has a very small bandwidth (long temporal coherence length) e.g. to match the designed properties of the diffractive pattern. Light from the light source may be filtered out to limit any detrimental effect on the normal operation of the telescope, in particular where the light source and/or metrology system is near the observation imaging focus of the telescope.

Figure 6:
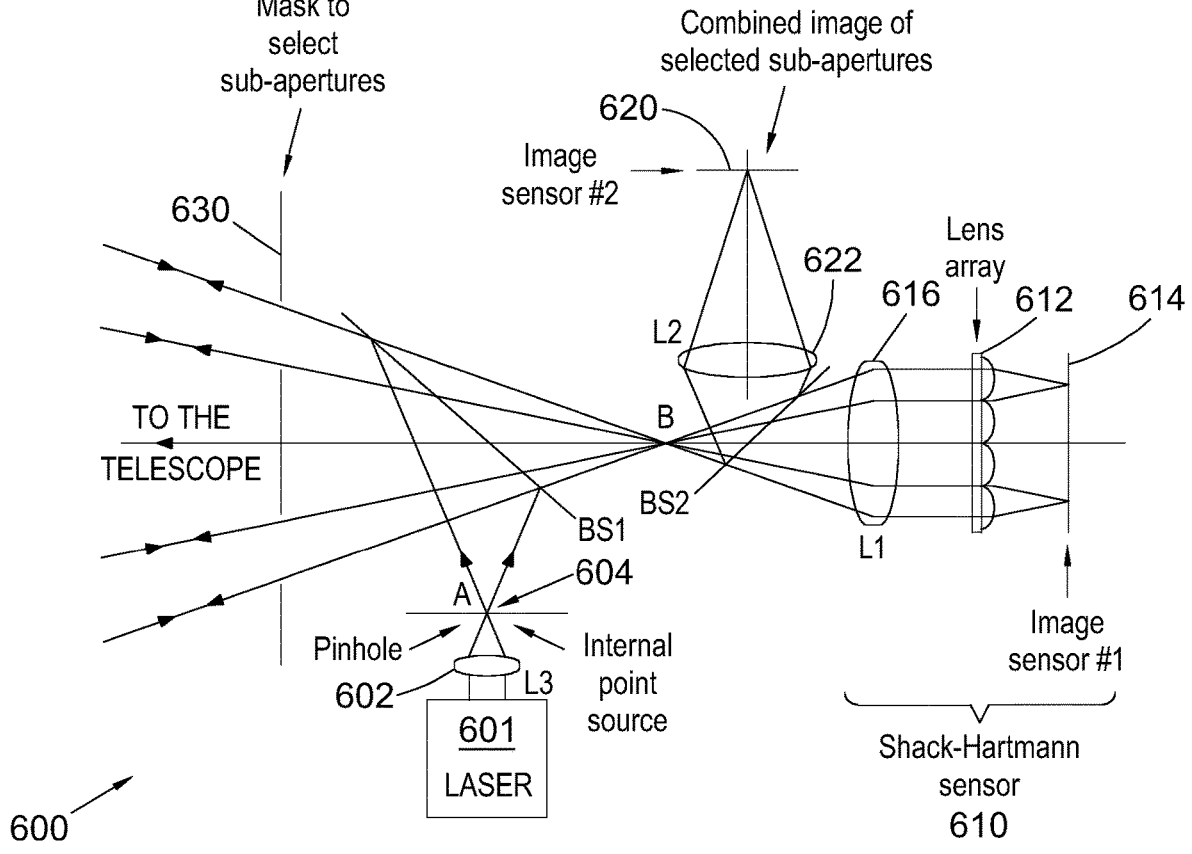
FIG. 6 shows a possible implementation of a metrology system.

FIG. 6 shows details of a metrology system 600 comprising a light source and a metrology system with one image sensor 614 for measuring tip tilt errors and one image sensor 620 for measuring phase errors, for use in a telescope such as described above. Light from a distant object being viewed by the telescope goes elsewhere and is recorded by another image sensor which is not shown in FIG. 6.

A laser light source 601 is focused to a pinhole aperture 604 at point A by optics 602 (lens L3), to create an internal point source. A beam splitter BS1 directs light from the light source into the telescope, e.g. towards the primary mirror/lens optionally via intermediate optics. Diffracted light from the diffraction pattern on a surface of one of the optical elements, e.g. the primary mirror/lens, is returned to point B, from where it is provided to a Shack-Hartman wavefront sensor 610 which is used to measure tip-tilt wavefront errors.

In the illustrated example some of the light from the source 601 is directed by a second beam splitter, BS2 and focused onto an image sensor #2 620 by optics 622, e.g. lens L2. The images captured by sensor #2 can be used to measure phase errors between the sub-apertures defined by the mask 630.

The Shack-Hartman wavefront sensor 610 comprises collimation optics 616 e.g. lens L1, which provides the wavefront to a lenslet array 612 which creates spots on image sensor #1 614. The displacement of each spot from an optical axis of a lenslet (in 2D) depends on the local slope of the wavefront (in 2D) and measures the local tip-tilt of the wavefront for the sub-aperture defined by the lenslet in the lenslet array. Known techniques may be applied to reconstruct the wavefront.

The system may include a mask or shutter system 630 to select one or more sub-apertures of the telescope; in implementations any sub-aperture combination may be selected e.g. pairs of sub-apertures. The mask/shutter system 630 may comprise a set of mechanical shutters and/or an LCD or some other device.

If desired e.g. for increased accuracy, piston, i.e. phase changes can be measured by using two (or more) sub-apertures simultaneously and tracking the fringes on image sensor #2. Movement of the fringes indicates a change in phase between the two (or more) sub-apertures. Known techniques may be applied to reconstruct the phase changes.

Absolute phase errors can be measured by measuring fringe shape on image sensor B 614; zero phase error corresponds to perfectly straight fringes.

Absolute phase errors can also be measured by measuring fringe contrast on image sensor B. Zero phase error occurs at maximum fringe contrast (maximum peak height in the modulation transfer function).

If the light source in the metrology system is a broad-band one, the image on sensor #2 620 will be formed by light from several values of the spectral order, m. In this case the image will only show fringes when the absolute phase error is small and hence the sensitivity to phase error is increased by using a broadband light source. If required, the tip-tilt Shack-Hartmann channel can still be restricted to a single spectral order by using a narrow-band filter or some other means.

Absolute phase errors can also be measured by measuring fringe visibility using an external broadband point source (i.e. a light source with a short coherence length), at which the telescope is pointed. In this case the diffractive pattern on e.g. the first optical surface of the telescope is not used. This can be used for setting an initial alignment and/or checking the other absolute phase measurements. Afterwards, the laser source may be used to maintain alignment when the telescope is pointed at some other target.

Figure 7:
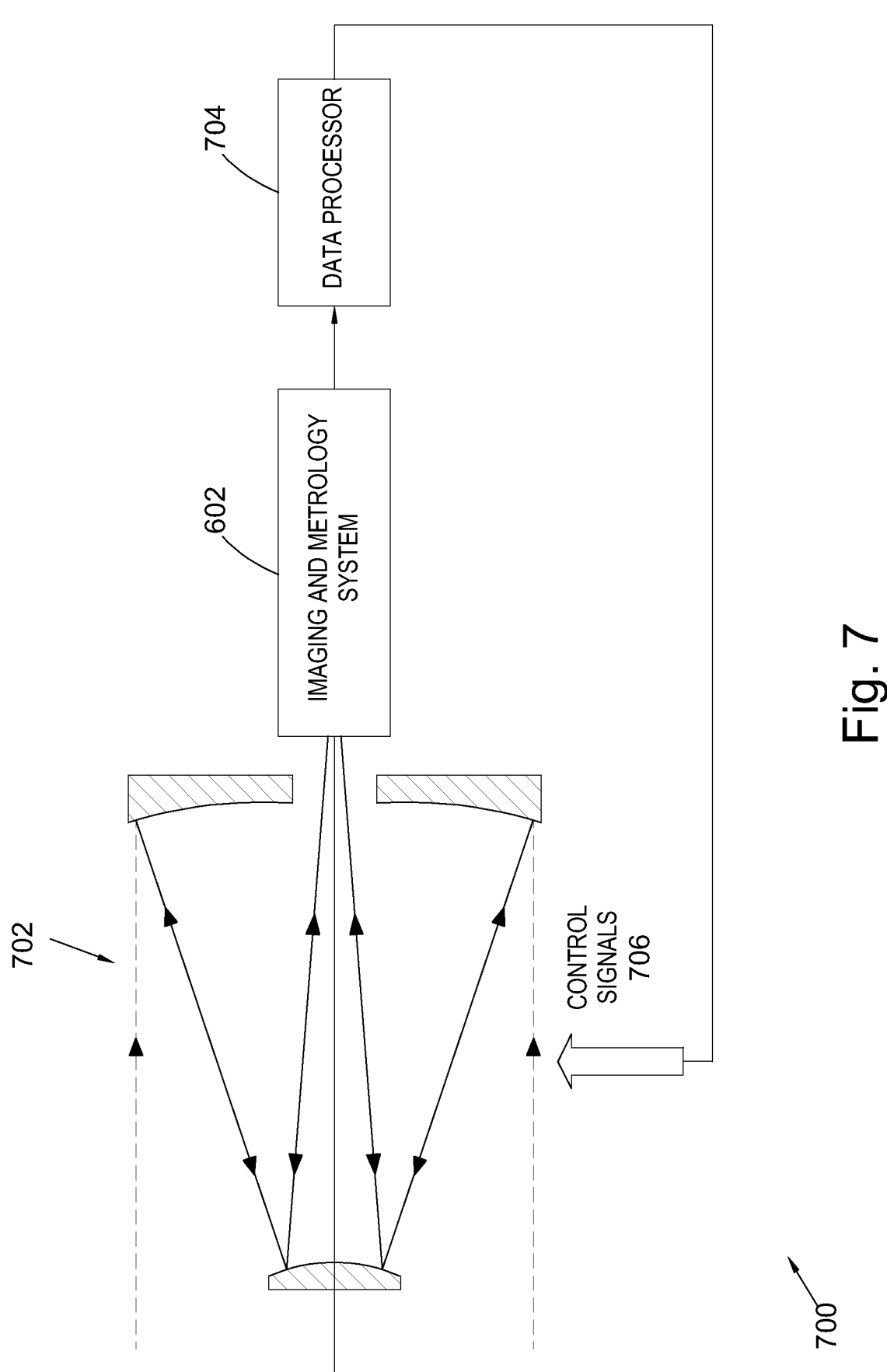
FIG. 7 illustrates the control loop for alignment of the telescope.

FIG. 7 shows an example of a telescope 700 including an optical alignment system and configured for automatic alignment. The telescope includes imaging optics 702, including a primary mirror, and an imaging and metrology system 600 as described above coupled to a data processor 704 e.g. a conventional computer system suitably programmed. The data processor 704 receives wavefront characterization data from the metrology system 600 characterizing a wavefront error at an imaging region of the telescope, and processes the data to provide control signals 706 to control the alignment of the imaging optics 702, e.g. a shape of the primary mirror and/or a shape or location of other imaging optical elements. Known algorithms may be used to control the optical elements using the sensed wavefront error to align the telescope.

FIG. 8 shows an illustration of how the imaging system for the telescope 801 can be at a separate location from the metrology system 600 that is shown in FIG. 6. Rays from the telescope 804 contain light from the distant object being viewed and from the metrology light source. A simple way to separate these is to use a dichroic beam-splitter or notch filter BS3 803 which only transmits the metrology light source wavelengths and reflects all the other wavelengths towards the imaging system 801 and on to the imaging sensor 802.

There are other ways to arrange that the metrology light and the light from the distant object arrive at different locations; For example the system can be designed so that the conjugates for the light source, the light from the distant object and the metrology sensors are in different locations. Another example is to separate them out in the time-domain.

Once the wavefront error has been measured the telescope can be brought into correct alignment e.g. by adjusting actuators that are attached to some of the optical elements of the telescope. The number of actuators, and the choice of which optical elements can be adjusted, will vary from system to system but should allow the wavefront errors to be corrected to give a specified image quality.

The telescope can be used as normal, for viewing distant objects, while the optical alignment, i.e. wavefront error measurement is taking place. Hence the optical alignment can be continuously adjusted to give minimal wavefront error and optimal optical alignment.

It is not necessary to use a Shack-Hartmann wavefront sensor (or a variant thereof) and other metrology systems can be used to measure the wavefront errors.

Operation of an Example Implementation

There are now described illustrative example simulations from Zemax OpticStudio™ for a three segment telescope, of the same general type as shown in FIG. 2.

In the simulations a diffractive coating on the three primary mirror segments returns light from a 635 nm point source located at an finite conjugate of the telescope. FIGS. 8*a*-8*f* show simulated images of this point source at another finite conjugate, imaged by the telescope via a diffractive coating on the primary mirror. In each case the figures show Y-position (over a range±141 μm for FIGS. 8*a,b* and over a range±71 μm for FIGS. 8*c-f*) on the y-axis and X-position (over a range±141 μm for FIGS. 8*a,b* and over a range±71 μm for FIGS. 8*c-f*) on the x-axis.

These example figures show that the light returned via the diffractive coating gives information regarding misalignments in the optical system, which can be used to correct the misalignments.

Figure 8B:
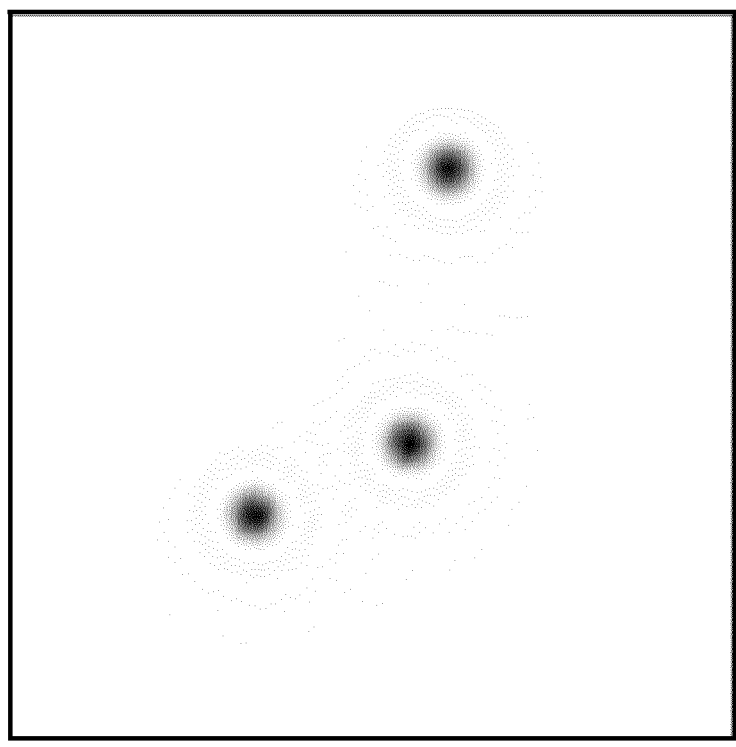
FIG. 8 shows a possible implementation which shows how the metrology system and the imaging system can be in different locations.
Figure 8A:
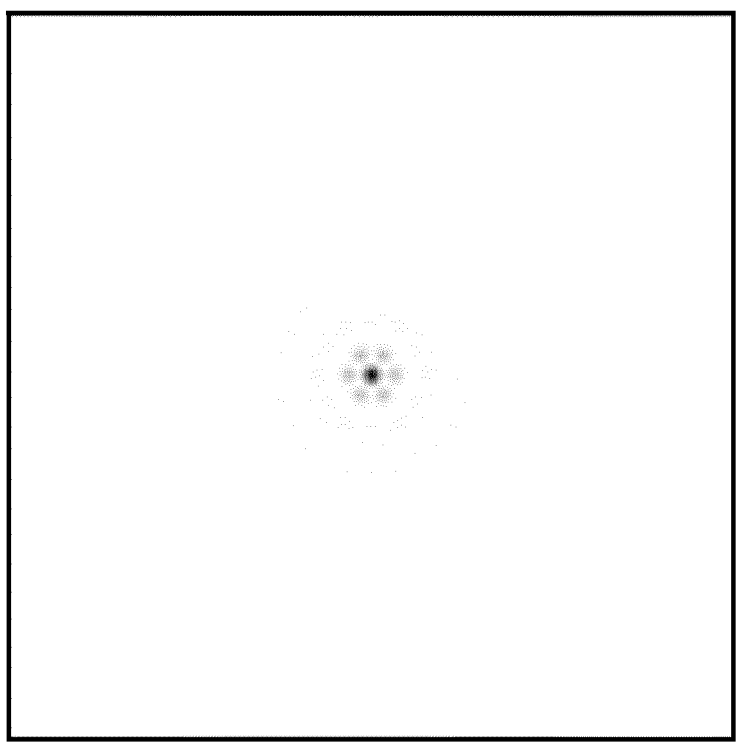

FIG. 8*a* shows an ideal case with three perfectly aligned primary segments, where the point source is imaged with the best possible resolution as given by geometry of the primary aperture.

FIG. 8*b* shows a misaligned case in which each of the three primary segments is misaligned in tip and tilt. The images of the point source from the three segments are separated in x,y in the image plane indicating misalignment which can be measured from the x,y coordinates of the three images. The tip and tilt of each segment may then be adjusted so that the images are coincident in the image plane FIG. 8*c* shows the interference fringes from just a single pair of perfectly aligned primary segments; as can be seen the fringes lack curvature.

Figure 8D:
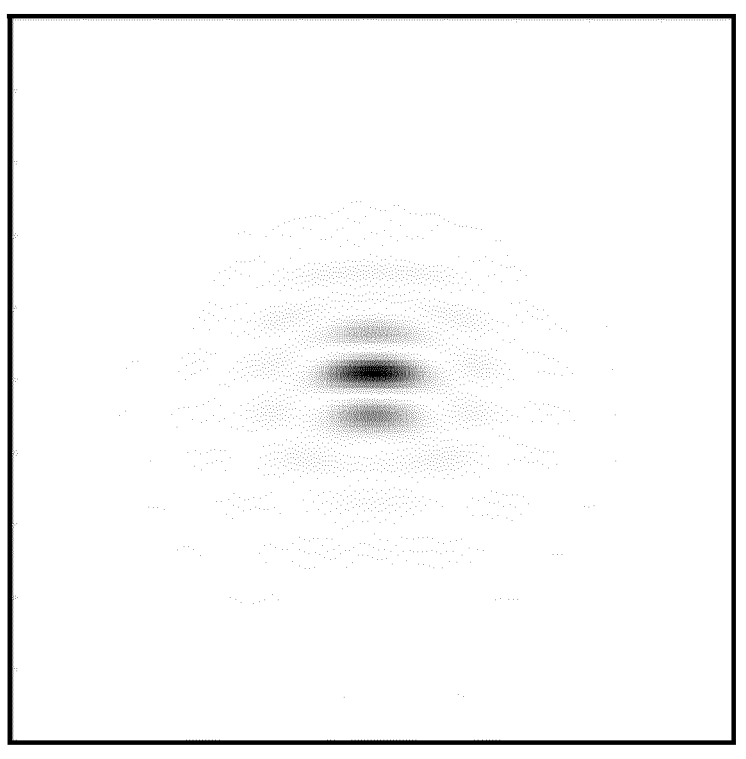
Figure 8C:
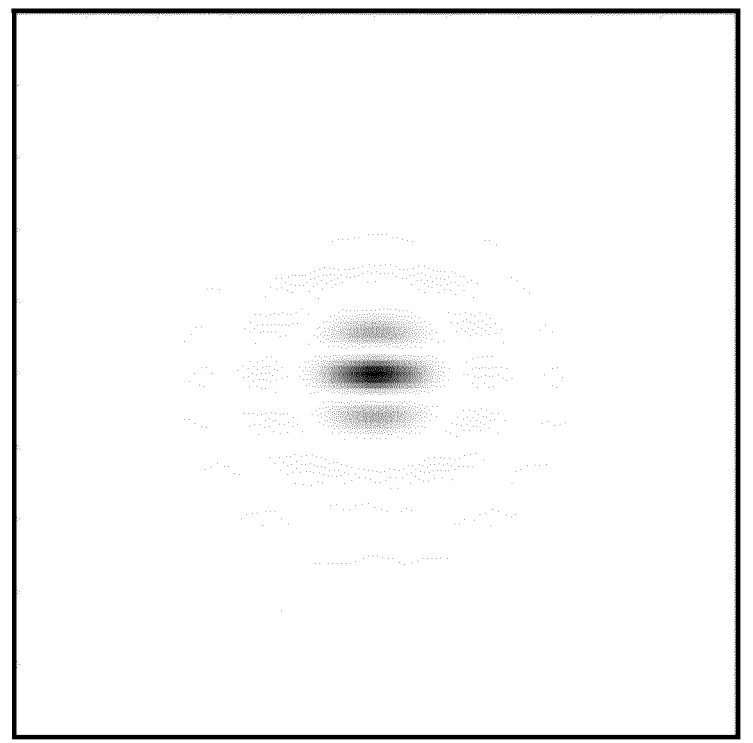

FIG. 8*d* shows the interference fringes from just a single pair of segments in the primary misaligned by +40 microns in piston. The tip and tilt of each segment is adjusted so that the images are coincident in the image plane. FIG. 8*d* shows significant curvature of the interference fringes which indicates misalignment. There is also a shift in the phase of the fringes, i.e. the central fringe is displaced away from a central (0,0) location (although this is difficult to see in the Figure).

Figure 8F:
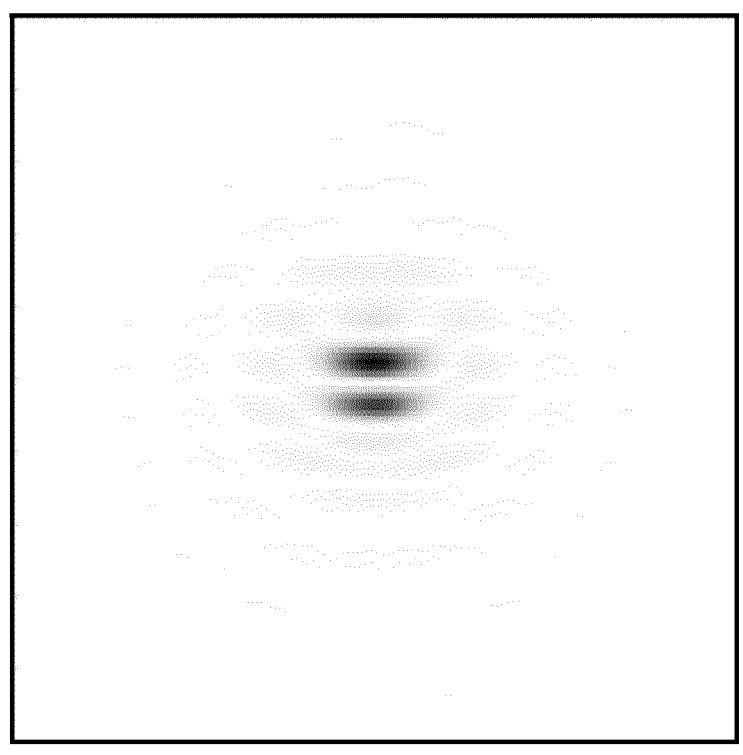
Figure 8E:
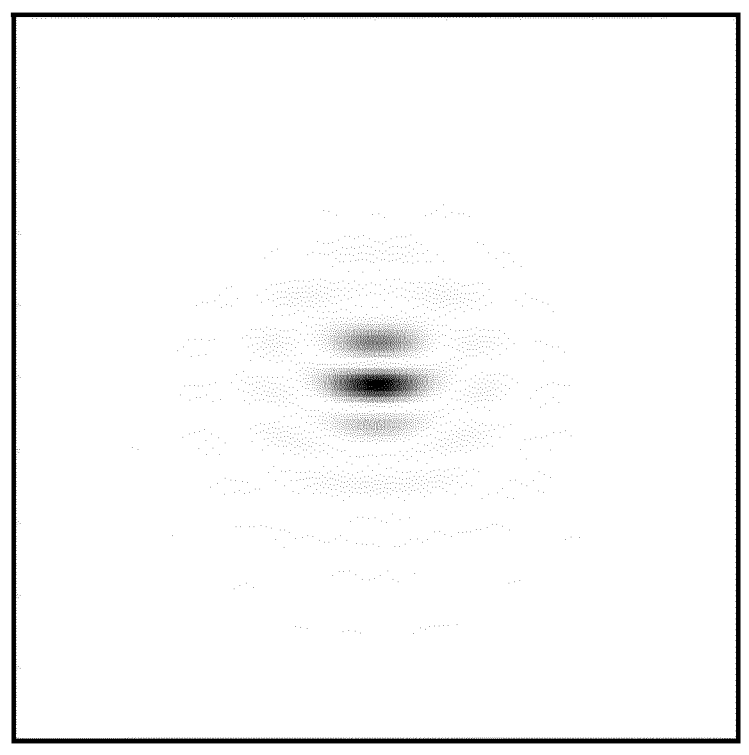

FIG. 8*e* shows the interference fringes from just a single pair of segments in the primary misaligned by −30.3 microns in piston. The tip and tilt of each segment is adjusted so that the images are coincident in the image plane. The curvature of the interference fringes indicates misalignment; the fringes are in the opposite direction and different magnitude to those of FIG. 8*d*. Again there is also a shift in the phase of the fringes.

FIG. 8*f* shows the interference fringes from just a single pair of segments in the primary misaligned by −30 microns in piston. The tip and tilt of each segment is adjusted so that the images are coincident in the image plane. The curvature of the interference fringes indicates misalignment, and there is a shift in the phase of the fringes. By comparison with FIG. 8*e* there is a difference in misalignment of 0.3 microns (300 nm) in piston, that is by around half a wavelength, which results in a shift in phase of the fringes compared with the FIG. 8*e* example.

No doubt many other effective alternatives will occur to the skilled person. For example in a terrestrial telescope such an active optics control system may be combined with an adaptive optical control system to correct for atmospheric distortion.

It will be understood that the invention is not limited to the described embodiments and encompasses modifications apparent to those skilled in the art lying within the spirit and scope of the claims appended hereto.

The invention claimed is:

1. A telescope comprising:
   a light collecting aperture;
   an optical alignment system; and
   an imaging region for an imaging system, wherein the optical alignment system comprises:
      a primary mirror with a diffraction pattern on a surface of the primary mirror formed by a diffraction grating;
      an internal light source to illuminate the diffraction pattern; and
      a metrology system with a wavefront sensor to receive diffracted light from the internal light source after diffraction by the diffraction pattern, wherein the wavefront sensor is configured to characterize a wavefront of the diffracted light and measure wavefront errors for determining an optical alignment of the telescope, wherein the internal light source and the metrology system define substantially coincident conjugate optical positions.

2. The telescope of claim 1 wherein the diffraction pattern comprises a pattern of diffracting rings.

3. The telescope of claim 1 wherein the diffraction pattern is configured to diffract less than 10% of light from the internal light source impinging on the surface.

4. The telescope of claim 1 further comprising an optical filter to attenuate light from the internal light source.

5. The telescope of claim 1 wherein the internal light source has a bandwidth of less than 1% of a wavelength of the internal light source.

6. The telescope of claim 1, wherein the surface is a first surface of the telescope and comprises a mirror surface, and wherein the substantially coincident conjugate optical positions are nearer to the mirror surface than a center of curvature of the mirror surface along an optical path based on a design of the diffraction grating.

7. The telescope of claim 1 wherein the metrology system comprises a Shack-Hartmann wavefront sensor.

8. A method of optically aligning a telescope, the telescope comprising a light collecting aperture, an optical alignment system including a primary mirror with a diffraction pattern on a surface of the primary mirror formed by a diffraction grating, an internal light source to illuminate the diffraction pattern, the method comprising:

using a surface of the primary mirror formed by a diffraction grating to diffract light from the internal light source to a metrology system having a wavefront sensor, wherein the internal light source and the metrology system define substantially coincident conjugate optical positions; and using the metrology system to determine wavefront characterization data characterizing a wavefront of the diffracted light; and optically aligning the telescope using the wavefront characterization data.

9. The method as claimed in claim 8 wherein the wavefront characterization data characterizes a wavefront error at an imaging region, and wherein optically aligning the telescope using the wavefront characterization data comprises adjusting an active optical element in response to the wavefront error.

10. The method as claimed in claim 8 wherein the method is performed whilst observing using the telescope.

* * * * *